Aug. 31, 1954
R. C. CHURCHMAN
2,687,841
VALVE USED AS A CONTROL
Original Filed Dec. 29, 1947
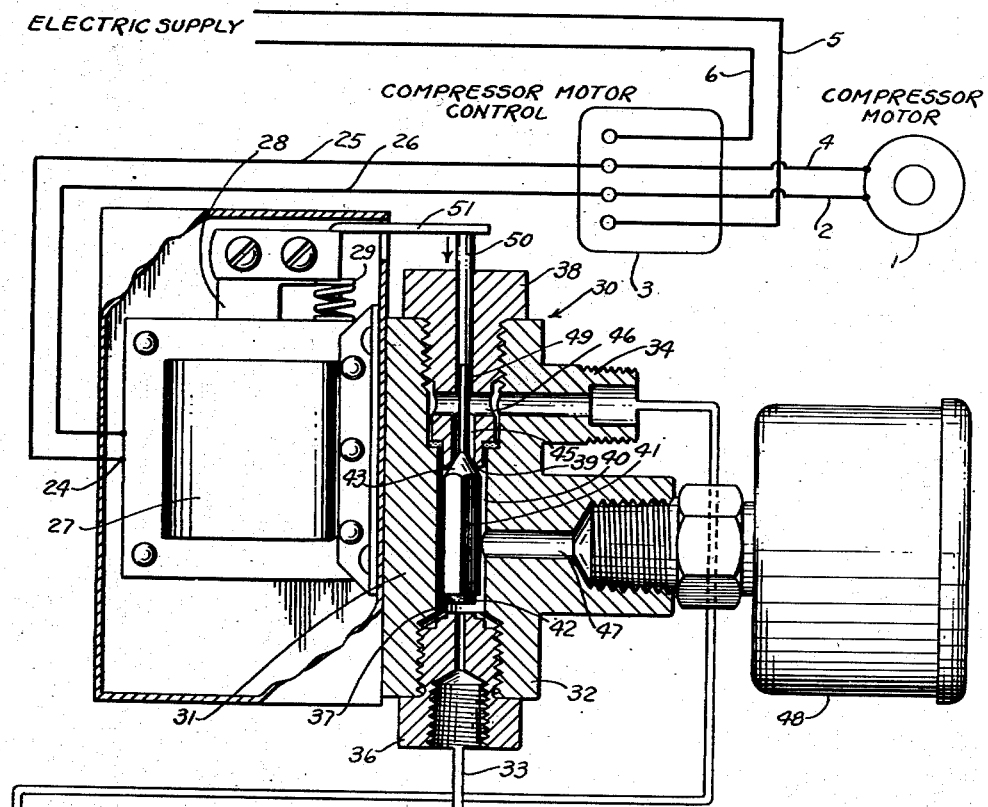
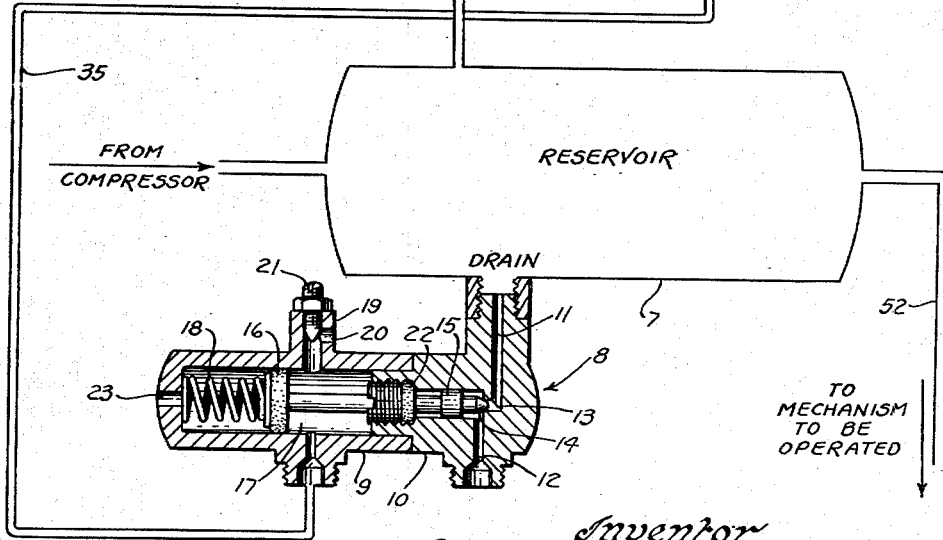
Witness
Edward P. Seeley
Inventor
Russell C. Churchman, Deceased,
By. Nellie Churchman, Executrix
by M. Talbert Dick
Attorney Patented Aug. 31, 1954

2,687,841

UNITED STATES PATENT OFFICE 2,687,841

VALVE USED AS A CONTROL

Russell C. Churchman, deceased, late of Des Moines, Iowa, by Nellie Churchman, executrix, Polk County, Iowa Original application December 29, 1947, Serial No. 794,387. Divided and this application December 1, 1950, Serial No. 198,511

3 Claims. (Cl. 230—24)

This is a divisional application from the prior application of Russell C. Churchman for a valve used as a control filed on December 29, 1947, having Serial No. 794,387, Patent No. 2,532,607, December 5, 1950.

This invention relates to a valve structure and more specifically to a valve structure that is an improvement in an air compressor, storage tank combination that functions to provide air under pressure to another valve connected to the air storage tank to open the valve and allow accumulated moisture from the air storage tank to escape.

Present air compressors are mostly all operated by an electric motor with the air compressor connected to an air storage tank. Electric current is furnished to the compressor motor through an electric switch. The electric switch is connected to the air storage tank and the switch is closed, allowing electric current to flow to the compressor motor, when the pressure of the air in the storage tank falls to a pre-determined low value. The switch is held closed and the air compressor operated until the air pressure in the storage tank reaches a predetermined high value, when the switch is opened and the air compressor stopped.

In other compressor installations, the compressor runs continuously, as with compressors on trucks or with big compressor units that require a large starting torque where it is more economical to allow the electric motor to run continuously. When the compressor puts pressure on the air in the air storage tank to the predetermined high value, valves in the compression cylinders of the compressor open and while the pistons operate in the cylinder, the cylinders are open to the atmosphere hence no compression of air takes place.

In applicant's previous application, Serial No. 625,225 filed October 29, 1945, Patent No. 2,552,518, May 15, 1951, the problem of draining accumulated moisture, that results from compressing air, from an air storage tank is discussed and a solution offered and applicant's application Serial No. 651,261 filed March 1, 1946, Patent No. 2,505,663, April 25, 1950, shows a valve member to be attached to a storage tank through which the accumulated moisture may drain. The present invention deals with a new and improved means in the form of a second valve to provide air under pressure to operate the valve connected to the air storage tank.

It is an object of the invention, among others, to provide new and improved valves wherein a pressure medium enters the valve and is stored in a reservoir when the outlet from the valve is closed and the inlet open; and the stored air from the reservoir released when the outlet is open and the inlet closed.

It is a further object of the invention to provide new and improved valves for an air compressor-storage tank combination wherein air under pressure enters the valve and is stored in a reservoir when the air compressor is not in operation; and each time the air compressor starts into operation the inlet to the valve is closed and the outlet opened so the stored air from the reservoir may be released to actuate another valve connected to the air storage tank to drain accumulated moisture therefrom.

It is still a further object of the invention to provide a new and improved valve for an air compressor-storage tank combination that will function to actuate a valve connected to the air storage tank to drain accumulated moisture therefrom that will function on any type of air compressor-storage tank combination, so long as the air compressor-storage tank combination starts and stops intermittently.

It is still a further object of the invention to provide new and improved valve means that will operate with an air compressor-storage tank combination, whether the air compressor be intermittent or continuous operation to actuate a valve connected to the air storage tank to drain accumulated moisture therefrom.

It is still a further object of the invention to provide a valve simple in construction and operation; economical in construction and operation, long lasting in operation; and economical to purchase.

With the foregoing and other objects in view, the invention will be more fully described herewith and will be particularly pointed out in the claims appended hereto.

In the drawings, wherein like symbols refer to like or corresponding parts throughout the several views, the figure shows this valve member partly in elevation and partly in cross-section and further shows a diagrammatic view of the organization into which the valve is placed.

This compressor motor and compressor unit is represented generally at 1 in the drawings and referred to hereafter as a compressor with conductor 2 running to the compressor unit 1 from switch 3. A return conductor 4 runs from the compressor unit 1 to the switch 3. A conductor 5 connects into switch 3, and a return ground conductor 6 leads away from the switch 3.

Referring now to the bottom of storage tank 7, valve 8 is shown in section connecting to the bottom of storage tank 7 to drain accumulated moisture from the bottom of storage tank 7. The valve has been previously claimed and described, but its function and use will again be set forth to show how the new and novel valve herein shown cooperates to release air under pressure to the valve 8. The valve 8 connects into the bottom of storage tank 7 and is actuated periodically to open the storage tank 7 through the valve 8 to the exterior to drain accumulated moisture from the storage tank 7. The valve 8 has a housing member made in two parts 9 and 10; slip fitted together for ease of assembly. The part 10 has an inlet 11 connecting into the bottom of the storage tank 7 and an outlet 12. The inlet 11 and outlet 12 are connected together within housing part 10 by a passageway 13, perpendicular to the inlet 11 and outlet 12, all of which make a conduit through the housing part 10. One end of the passageway 13 forms a valve seat 14 and a valve stem 15 seats on the seat 14 to close off flow through the conduit in the housing part 10. The valve stem 15 connects with a piston 16, reciprocal within a chamber 17 formed within the housing part 9 and a spring 18 acts against piston 16 to force the piston 16 to the right, thus moving valve stem 15 to the right into sealing engagement with the seat 14 to close off passage 13. A pressure medium such as the air under pressure in the storage tank 7 flows from the new and improved valve to chamber 17 to exert its pressure against piston 16, forcing piston 16 to the left against the tension in spring 18 thus pulling valve stem 15 off of seat 14 to open the conduit through the housing section 10 to drain moisture that may have accumulated in the storage tank 7. An outlet 19 leads from chamber 17 to allow the air under pressure entering chamber 17 to escape. The outlet 19 has a restricted opening 20 which opening 20 can be adjusted by restricting screw 21 to vary the size of opening 20. The chamber 17 is sealed from the conduit in housing part 10 by a gasket 22, which also seals valve stem 15 passing through gasket 22. When chamber 17 becomes exhausted of air under pressure, spring 18 forces the valve stem 15 to the right into engagement with seat 14, thus closing off the conduit through the housing part 10. An opening 23 is provided in housing part 9 to allow air under pressure that may seep back of piston 16 to escape to the atmosphere.

The electric switch 3 as previously explained, connects into the compressor assembly 1 and when switch 3 is closed, sets the compressor 1 into operation. The switch 3 is connected into the storage tank 7 in the usual way (not shown) and when the pressure in storage tank 7 drops to a predetermined low value, the switch 3 is closed, the compressor 1 set into operation and the pressure of air in storage tank 7 raised to a predetermined high value at which time the switch 3 is opened and compressor 1 stops operation.

A means 24, which may be a solenoid in one species, is electrically connected into switch 3 by conductor 25 running to solenoid 24 and a return conductor 26 entering switch 3. When the switch 3 is closed, electric current flows to solenoid 24 to energize electro-magnet 27 which in turn pulls plunger 28 downwardly. When switch 3 is open, no electric current flows to electro-magnet 27 hence it is not energized and spring 29 will push plunger 28 upwardly. It can be seen that when compressor 1 operates the electro-magnet 27 of solenoid 24 will also be energized.

The new and improved valve is represented generally at 30 and has a housing 31. The housing 31 has an inlet end 32 which connects by a conduit 33 with the air storage tank 7. The housing 31 also has an outlet end 34 which connects by a conduit 35 into the valve 8 and discharges air under pressure into the chamber 17. The inlet end 32 of housing 31 receives a thimble 36 with the inner end 37 of the thimble providing a seat for a valve stem to seat against. The seat 37 must be machined for a perfect seal, hence placing the seat 37 on the thimble 36 allows easy machining and allows housing 31 to be cast without any machining. A thimble 38 fits into the top of housing 31 and has a seat 39. Between the seats 37 and 39 is a chamber 40.

A valve stem is included within the valve housing and has a lower portion 41 to fit within the chamber 40 between seats 37 and 39. The valve stem portion 41 is shorter than the length of chamber 40 and is smaller in diameter than the chamber 40 to leave a passageway between the chamber 40 and the valve stem portion 51. The lower end of the valve stem portion 41 has a sealing member 42 to contact seat 37 on thimble 36 when the valve stem portion 41 is in its extreme downward position to close off flow to chamber 40 from the inlet end 32. When the valve stem is in its extreme downward position, a tapered portion 43 on the upper end of the valve stem portion 41 is pulled out of engagement with seat 39 on the bottom of thimble 38 and the chamber 40 is opened to passageways 45 and 46 in thimble 38 which passageways 45 and 46 in turn connect into the outlet end 34. A passageway 47 connects into chamber 40 and has a reservoir 48 of substantial capacity connected to the other end of passageway 47.

The valve stem has a portion 49 above the lower portion 41 that extends through the passageway 45 and is of a smaller diameter than the passageway 45 to make a passageway between the valve stem portion 49 and the inner wall of the passageway 45. A valve stem portion 50 extends through the thimble 38 and has a sealing fit within the thimble and extends beyond the valve housing 31 which portion 50 of the valve stem is contacted by an arm 51 extending from the plunger 28 of the solenoid 24.

In operation of the new and improved valve 30 of Figure 1, when the compressor is not in operation the parts of the organization are in the position shown in Figure 1. In this position, the electromagnet 27 is not energized, hence spring 29 pushes plunger 28 to its extreme upward position. The valve stem is restrained in its upward movement by the tapered portion 43 of the valve stem portion 41 contacting the seat 39 on the lower end of the thimble 38. The arm 51 connected to plunger 28 is so positioned that it will not in any way restrain the tapered portion 43 from seating on seat 39 and sealing chamber 40 from the outlet 34. The inlet end is connected by conduit 33 with storage tank 7 and the air under pressure in storage tank 7 will flow to the inlet 32 of the valve housing and the pressure of the air will force the valve stem upwardly with the tapered portion 43 seating on the seat 39. The air under pressure will enter chamber 40, passageway 47 and air reservoir 48 until the pressure in reservoir 48 is the same as in storage tank 7.

When the pressure in storage tank 7 falls by use of the air under pressure through outlet 52 leading from the storage tank 7, it becomes necessary to maintain the pressure on the air in the storage tank 7. Let us assume the top pressure maintained on the air in storage tank 7 is 125 pounds per square inch. As the air is used from storage tank 7 its pressure drops until 100 pounds per square inch is registered. At this point, the lower predetermined value, the switch 3 is closed, starting compressor 1 into operation to build the pressure on the air in storage tank 7 up to 125 pounds per square inch.

The solenoid 24 attached to valve housing 31 also has electric current flow to the electromagnet 27 to energize the electromagnet 27. The plunger 28 is pulled downwardly along with arm 51 compressing coil spring 29. The arm 51 contacts the valve stem portion 50, forcing the valve stem downwardly until the gasket 42 on the lower portion 41 of the valve stem rests on the seat 37 and seals the inlet from the chamber 40 thus closing off communication between storage tank 7 and chamber 40. At the same time, the tapered portion 43 on the top of the lower portion 41 of the valve stem is pulled off the seat 39. A passageway is open in the chamber 40 between the lower valve stem portion 41 and the chamber wall 40 in communication with the reservoir 48. The valve stem portion 49 and the wall of passageway 45 leave a space to connect the passageway in chamber 40 with the passageway 46. The passageway 46 connects into outlet 34 and allows the air under pressure stored in reservoir 48 to flow through conduit 35 into chamber 17 of valve 8 to open the valve 8 and allow accumulated liquid in storage tank 7 to drain.

So long as the compressor 1 operates and until the pressure in storage tank 7 is built up to the predetermined value of 125 pounds per square inch, as was assumed, the solenoid 24 and arm 51 will hold the valve stem seated on the seat 37. When the storage tank attains the top pressure, of said 125 pounds per square inch, the switch 3 is opened and the compressor 1 stops and the solenoid 24 becomes de-energized. The coil spring 29 will move the arm 51 upwardly, and the air pressure from storage tank 7 will force the valve stem upwardly until the tapered portion 43 seats on the portion 39 closing off flow to the outlet 34. The air reservoir 48 will again fill and be ready to supply air under pressure to the chamber 17 of valve 8 to drain accumulated moisture from the storage tank 7.

It will be seen that a valve is presented in Figure 1 that functions every time a compressor starts into operation to provide the pressure medium to actuate a valve to drain accumulated moisture from a storage tank or is adapted for use with compressors that operate intermittently. Further the operation of the valve is dependent on an air storage tank and a switch to start the compressor into operation when the pressure drops to a predetermined low value, two features that all intermittently operating compressor units have regardless of any other features hence the present structure would have general application in the intermittent operation field.

It will be understood that the invention has been described for purposes of illustration and explanation and that changes and variations are possible without departing from the scope of the invention; all such modifications and changes are intended to be included in the appended claims.

Some changes may be made in the construction and arrangement of my valve used as a control and method of making same without departing from the real spirit and purpose of my invention, and it is my intention to cover by my claims, any modified forms of structure or use of mechanical equivalents which may be reasonably included within their scope.

I claim:

1. In an air compressor having a motor operating the air compressor and the air compressor motor placed into operation by an electric switch, said electric switch connected with an air storage tank associated with the air compressor and the electric switch controlling the compressor motor, closing when the pressure in the air storage tank falls to a predetermined value, said air storage tank having a valve means opened by air under pressure connected therewith to drain accumulated moisture from the air storage tank each time the compressor motor operates, the improvement comprising a second valve structure having a valve housing with an inlet in an end of the housing connected to the air storage tank and an outlet in an end of the housing connected into the first mentioned valve, a thimble entered into the inlet of the valve housing with the inner end of the thimble presenting a seat, a second thimble entered into the outlet end of the valve housing with the inner end of the thimble presenting a seat, a chamber between the two seats and within the valve housing, a valve within the chamber alternately seating on the seat on the inlet end and the seat on the outlet end, an air reservoir associated with the chamber, said valve within the chamber being smaller than the chamber to form a passageway between the valve stem and chamber to the outlet from the air reservoir when the valve stem seats on the thimble in the inlet end and a solenoid connected with the electric switch and energized to force the valve stem downwardly into closed position against the seat on the inlet thimble when the compressor motor starts into operation.

2. In an air compressor having a motor operating the air compressor and the air compressor motor placed into operation by an electric switch, said electric switch connected with an air storage tank associated with the air compressor and the electric switch controlling the compressor motor, closing when the pressure in the air storage tank falls to a predetermined value, said air storage tank having a valve means opened by air under pressure connected therewith to drain accumulated moisture from the air storage tank each time the compressor motor operates, the improvement comprising a second valve structure having a valve housing with an inlet in an end of the housing connected to the air storage tank and an outlet in an end of the housing connected into the first mentioned valve, a thimble entered into the inlet of the valve housing with the inner end of the thimble presenting a seat, a second thimble entered into the outlet end of the valve housing with the inner end of the thimble presenting a seat, a chamber between the two seats and within the valve housing, a valve within the valve housing having a portion of the valve stem in the chamber and another portion of the valve stem extending above the valve housing, said portion of the valve within the chamber being of a less length than the chamber so it may alternately seat on the seat on the inlet end and the seat on the outlet end, an air reservoir connected to the valve housing and a passageway connecting the reservoir with the chamber, said valve stem within the chamber being of a smaller diameter than the chamber to form a passageway between the valve stem and chamber to the outlet from the air reservoir when the valve stem is seated on the inlet seat and a solenoid connected to the valve housing having an arm in contact with the top of the valve stem with said solenoid connected with the electric switch and energized to force the arm and the valve stem downwardly into closed position across the seat on the inlet thimble when the compressor motor starts into operation.

3. In an air compressor having a motor operating the air compressor and the air compressor motor placed into operation by an electric switch, said electric switch connected with an air storage tank associated with the air compressor and the electric switch controlling the compressor motor, closing when the pressure in the air storage tank falls to a predetermined value, said air storage tank having a valve means opened by air under pressure connected therewith to drain accumulated moisture from the air storage tank each time the compressor motor operates, the improvement comprising a second valve structure having a valve housing with an inlet into the housing connected to the air storage tank and an outlet therefrom connected into the first mentioned valve, a first valve seat within said valve housing communicating with said inlet, a second valve seat within said valve housing communicating with said outlet, a chamber between said first and second valve seats, a valve within said chamber alternately seating on said first and second valve seats, an air reservoir associated with said chamber, said chamber provided with a passageway connecting said reservoir to said second valve seat when said valve is seated on said first valve seat, and a solenoid connected with the electric switch and energized to force said valve stem downwardly against said first valve seat when the compressor motor starts into operation.

References Cited in the file of this patent
UNITED STATES PATENTS

| Number | Name | Date |
| --- | --- | --- |
| 2,007,358 | Anger | July 9, 1935 |
| 2,330,027 | Churchman et al. | Sept. 21, 1943 |
| 2,505,663 | Churchman | Apr. 25, 1950 |
| 2,509,879 | Pelton | May 30, 1950 |
| 2,532,607 | Churchman | Dec. 5, 1950 |
| 2,552,518 | Churchman | May 15, 1951 |